United States Patent [19]
Koike

[11] Patent Number: 5,452,107
[45] Date of Patent: Sep. 19, 1995

[54] IMAGE PROCESSING APPARATUS PROVIDING A BILEVEL IMAGE SIGNAL BY CHANGING BINARIZATION THRESHOLD VALUE BASED ON DENSITIES OF ORIGINAL IMAGE AREAS INCUDING TARGET PIXEL AND LESS THAN ALL SURROUNDING PIXELS

[75] Inventor: Kazumasa Koike, Atsugi, Japan

[73] Assignee: Ricoh Company, Ltd., Tokyo, Japan

[21] Appl. No.: 214,244

[22] Filed: Mar. 17, 1994

[30] Foreign Application Priority Data

Mar. 19, 1993 [JP] Japan .................. 5-083788

[51] Int. Cl.6 .................. H04N 1/32; H04N 1/40
[52] U.S. Cl. .................. 358/468; 358/456; 358/457; 358/465; 358/466
[58] Field of Search ........... 358/456, 457, 458, 459, 358/460, 461, 465, 466, 468

[56] References Cited

U.S. PATENT DOCUMENTS 5,072,291 12/1991 Sekizawa ...................... 358/456
5,200,841 4/1993 Kotaki ...................... 358/455

FOREIGN PATENT DOCUMENTS 56-109069 8/1981 Japan .

Primary Examiner—Edward L. Coles, Sr.
Assistant Examiner—Allan A. Esposo
Attorney, Agent, or Firm—Popham, Haik, Schnobrich & Kaufman, Ltd.

[57] ABSTRACT

An image processing apparatus includes a matrix register part for reading an original image for each area containing a predetermined number of pixels of the original image, and for extracting multilevel image data corresponding to the pixels of the read area, the pixels including a target pixel and neighboring pixels surrounding the target pixel, an averaging part for providing the average of multilevel image data based on the data of the pixels extracted by the matrix register part, and a binarization part for providing a bilevel image signal corresponding to the multilevel image data of the target pixel by using the average of the multilevel image data from the averaging part as a threshold value of binarization.

7 Claims, 3 Drawing Sheets

| A | B | C |
|---|---|---|
| D | E | F |
| G | H | I |

IMAGE PROCESSING APPARATUS PROVIDING A BILEVEL IMAGE SIGNAL BY CHANGING BINARIZATION THRESHOLD VALUE BASED ON DENSITIES OF ORIGINAL IMAGE AREAS INCUDING TARGET PIXEL AND LESS THAN ALL SURROUNDING PIXELS

BACKGROUND OF THE INVENTION

The present invention generally relates to an image processing apparatus, and more particularly to an apparatus for providing a bilevel image signal corresponding to multilevel image data obtained from a scanned original image.

A scanner unit of a facsimile machine is an image processing apparatus for providing a bilevel image signal corresponding to multilevel image data obtained through raster scanning of an original image. The bilevel image signal is generated by subjecting the multilevel image data to a known binarization process by using a threshold value. Hereinafter, generating a bilevel image signal from multilevel image data is referred to as binarization. Several improved image processing devices of this type have been proposed for better picture quality of the bilevel image.

For example, Japanese Laid-Open Patent Application No. 56-109069 discloses a proposed image processing apparatus. In the conventional apparatus disclosed in the above mentioned publication, a bilevel image signal is generated from image data obtained from an original image by using the average of image data of the target pixel and its neighboring pixels as the threshold value of binarization.

However, when an original image containing an area of relatively uniform, intermediate density is read, the bilevel image corresponding to the uniform density area, produced by the conventional apparatus, may become unclear or dull. Also, the conventional apparatus may erroneously produce black pixels when a stained background portion of the original image is read and it is subjected to the binarization. In such cases, the resulting bilevel image contains some noise and the picture quality becomes poor. The conventional apparatus has some problems in that it does not detect whether or not a target pixel of the original image is in a uniform density area, and that it always uses the average of the image data as the threshold value of binarization even when the target pixel is in a uniform density area. In order to obtain better picture quality of the bilevel image, it is necessary to vary the threshold value of binarization depending on the features of the read areas of the original image.

SUMMARY OF THE INVENTION

Accordingly, it is a general object of the present invention to provide an improved image processing apparatus in which the above described problems are eliminated.

Another, more specific object of the present invention is to provide an image processing apparatus which provides a bilevel image with good picture quality by changing a threshold value of binarization depending on the densities of the areas of the original image.

The above mentioned objects of the present invention are achieved by an image processing apparatus which includes: a matrix register part for reading an original image for each area containing a predetermined number of pixels of the original image, and for extracting multilevel image data corresponding to the pixels of the read area, the pixels including a target pixel and neighboring pixels surrounding the target pixel; an averaging part for providing the average of multilevel image data based on the data of the pixels extracted by the matrix register part; and a binarization part for providing a bilevel image signal corresponding to the multilevel image data of the target pixel by using the average of the multilevel image data from the averaging part as a threshold value of binarization.

The above mentioned objects of the present invention are also achieved by an image processing apparatus which includes: a matrix register part for reading an original image for each area containing a predetermined number of pixels of the original image, and for extracting multilevel image data corresponding to the pixels of the read area, the pixels including a target pixel and neighboring pixels surrounding the target pixel; an averaging part for providing the average of the multilevel image data based on the data of the pixels extracted by the matrix register part; a binarizing part for providing a bilevel image signal corresponding to the multilevel image data of the target pixel by using the average of multilevel image data from the averaging part as a threshold of the binarization; an area detecting part for detecting whether or not the target pixel of the read area is in a uniform density area of the original image based on whether or not the differences in multilevel image data between the target pixel and the respective neighboring pixels are smaller than a given reference value, and for supplying the result of the area detection with respect to the target pixel; a first binarizing part, associated with the area detecting part and the averaging part, for providing a first bilevel signal corresponding to the multilevel image data by using a given threshold value when the target pixel is detected to be in a uniform density area, and for providing a first bilevel signal corresponding to the multilevel image data by using the average of the multilevel image data from the averaging part as a threshold value of binarization when the target pixel is detected not to be in a uniform density area; a second binarizing part, associated with the averaging part, for providing a second bilevel signal corresponding to the average of the multilevel image data from the averaging part by using a given dither pattern; and selecting part for selectively outputting one of the first bilevel signal from the first binarizing part and the second bilevel signal from the second binarizing part in accordance with a mode selection signal.

According to the present invention, it is possible to binarize the multilevel image data obtained through the scanning of the original image by using the fixed threshold value when the target pixel is in a uniform density area, and to binarize the multilevel image data by using the average of the data of the target pixel and its neighboring pixels when the target pixel is not in a uniform density area. Thus, it is possible to prevent the resulting bilevel image from becoming unclear when the multilevel image data is read from an original image containing a uniform density area.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
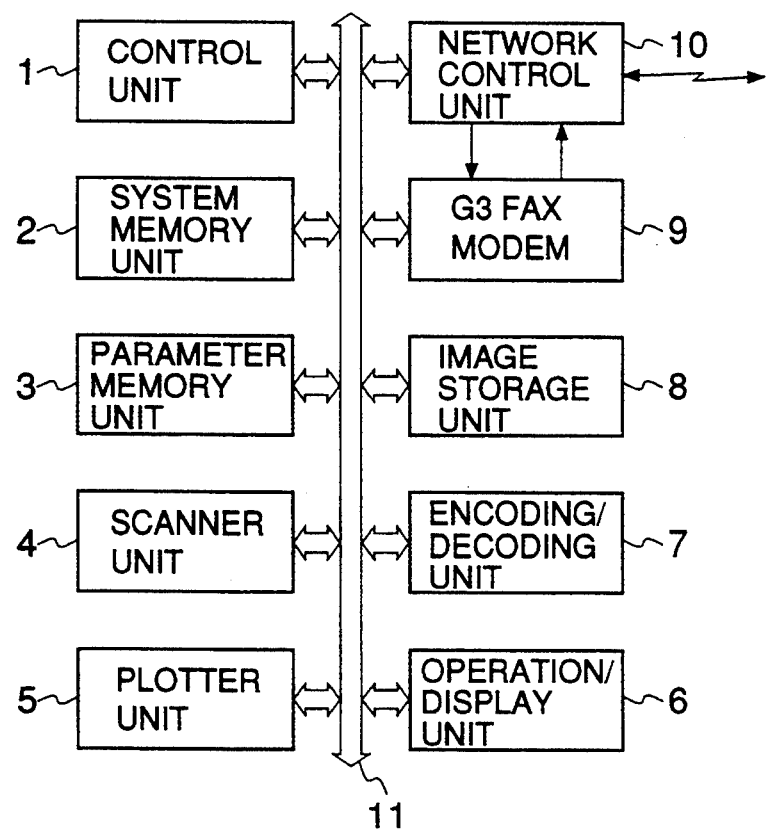
FIG. 1 is a block diagram showing a facsimile system to which the present invention is applied.

A description will now be given of a facsimile system to which the present invention is applied. FIG. 1 shows a facsimile system to which an embodiment of the present invention is applied.

The facsimile system in FIG. 1 comprises a control unit 1, a system memory unit 2, a parameter memory unit 3, a scanner unit 4, a plotter unit 5, and an operation/display unit 6. This facsimile system is designed in conformity with the CCITT Group-3 (G3) data communication protocol.

The control unit 1 controls operation of the component units of the facsimile system, and carries out a facsimile data transmission procedure. The system memory unit 2 stores a control program executed by the control unit 1 to control the operation of the component units.

The system memory unit 2 stores data that is necessary for the control unit 1 when the control program is executed or the facsimile data transmission procedure is carried out. Also, the system memory unit 2 constitutes a work area used by the control unit 1 when the control program is performed. The parameter memory unit 3 stores parameter data that is inherent to the G3 facsimile protocol used by the facsimile system.

The scanner unit 4 reads an original image at a given resolution to provide multilevel image data through a scanning of the original image. The plotter unit 5 prints a received image at a given resolution.

The operation/display unit 6 is comprised of a combination of a set of control keys and some displays. The set of control keys allows an operator to operate the facsimile system in some way. The display indicates operating conditions of the facsimile system.

In addition, the facsimile system in FIG. 1 comprises an encoding/decoding unit 7, an image storage unit 8, a G3 fax modem (modulator/demodulator) unit 9, and a network control unit 10. All the component units of the facsimile system are interconnected by a system bus 11. The data is sent and received between the component units of the facsimile system via the system bus 11.

The encoding/decoding unit 7 provides the data compression for transmitting image signals, and provides the data decompression for compressed image signals being received. The image storage unit 8 stores a number of files of compressed image data.

The modem unit 9 is capable of sending and receiving document data at a low transmission rate in accordance with the CCITT V.21 protocol, and is capable of sending and receiving image data at higher transmission rates in accordance with the CCITT V.29 or V.27ter protocol.

The network control unit 10 is a control unit for connecting the facsimile system to a public telephone line or a public network. The network control unit 10 is provided with an automatic data sending and receiving function. The data from the network control unit 10 is sent directly to the modem unit 9, and the data from the modem unit 9 is sent directly to the network control unit 10.

Figure 2:
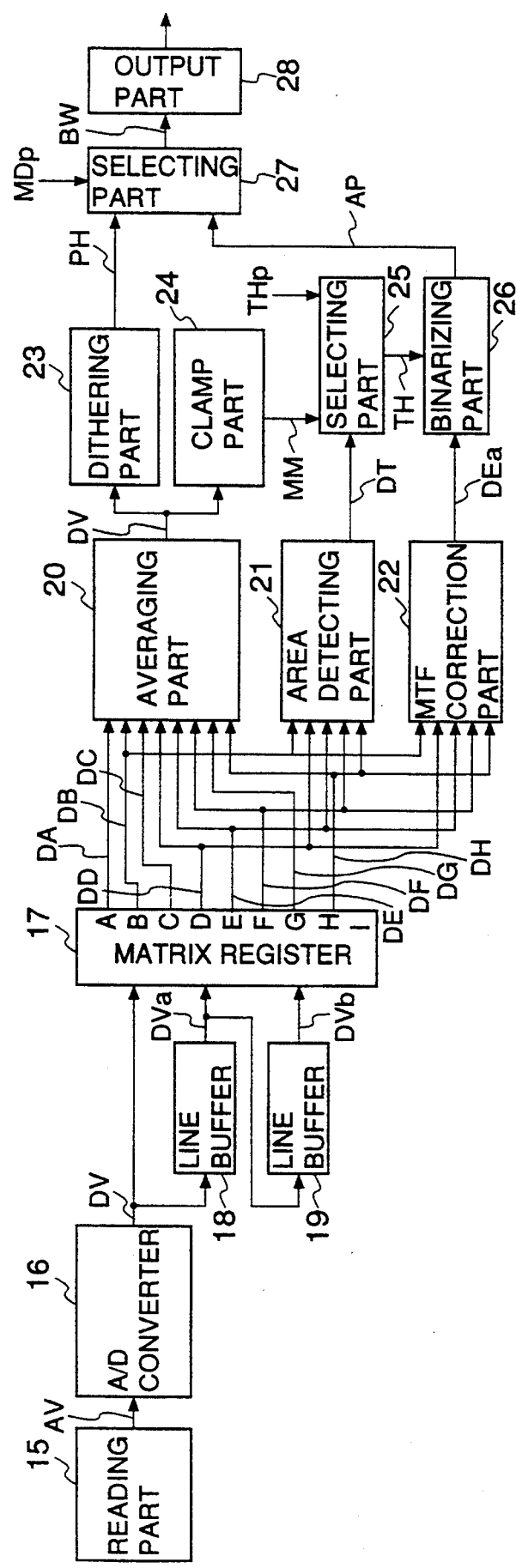
FIG. 2 is a block diagram showing a scanner unit of the facsimile system in FIG. 1 according to the present invention.

Next, a description will be given of an image processing apparatus according to the present invention. FIG. 2 shows a scanner unit of the facsimile system according to the present invention.

The scanner unit shown in FIG. 2 comprises a reading part 15, an analog-to-digital (A/D) converter 16, two line buffers 18 and 19, and a matrix register 17. The reading part 15 reads an original image to output an analog signal AV to the A/D converter 16 for each pixel. The reading part 15 sequentially supplies the analog signals AV corresponding to a scanning line, to the A/D converter 16.

The A/D converter 16 converts the analog signal AV supplied from the reading part 15 into a digital signal DV, this digital signal DV containing a given number of bits representing a single dot. The digital signal supplied from the A/D converter 16 is multilevel image data corresponding to a single dot of the original image. The A/D converter 16 supplies a sequence of digital signals DV corresponding to a line, to the matrix register 17 and to the line buffer 18 at the same time.

The line buffer 18 has a storage capacity needed to store the digital signals DV corresponding to a single line. The line buffer 18 outputs a sequence of digital signals DVa corresponding to a preceding line, to the matrix register 17 and to the line buffer 19 at the same time as the A/D converter 16 outputs the sequence of digital signals DV. Also, the line buffer 19 has a storage capacity needed to store the digital signals DVa corresponding to a single line. The line buffer 19 outputs a sequence of digital signals DVb corresponding to a further preceding line, to the matrix register 17 at the same time as the A/D converter 16 outputs the sequence of digital signals DV.

Therefore, the matrix register 17 extracts the data of pixels corresponding to three successive lines of the original image at a time in accordance with the digital signals DV supplied from the A/D converter 16, the digital signals DVa supplied from the line buffer 18, and the digital signals DVb supplied from the line buffer 19. The data of pixels stored in the matrix register 17 corresponds to dots of an area of the original image, these dots being arranged in a 3×3 matrix pattern shown in FIG. 3 and designated by the reference characters A through I.

Figures 3, 4:
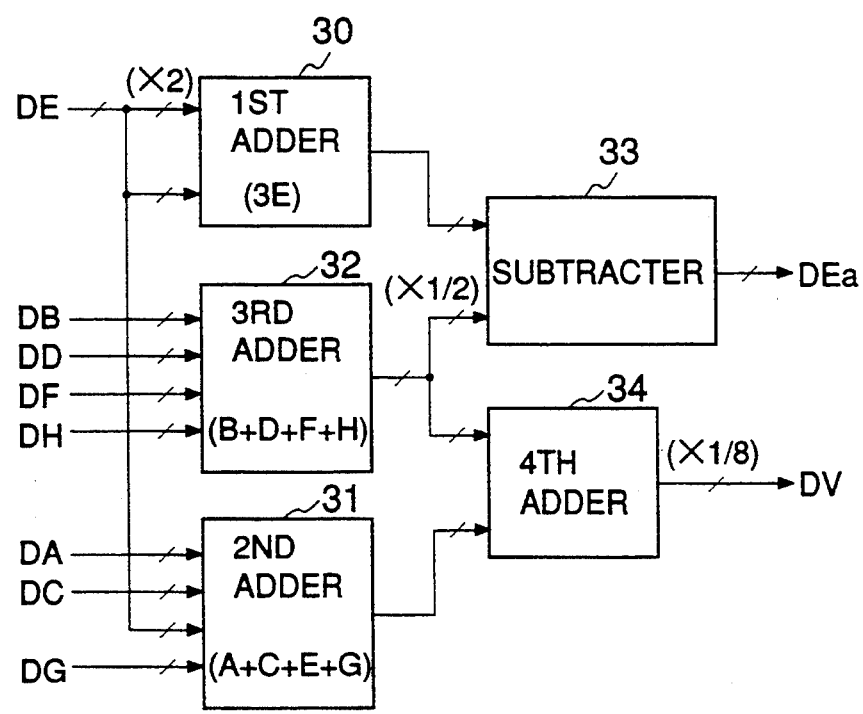
FIG. 3 is a diagram showing a pattern of pixels of an original image processed by the image processing apparatus of the present invention.
FIG. 4 is a block diagram showing a modification of an MTF correcting part and an averaging part of the image processing apparatus according to the present invention.

In FIG. 3, the center pixel E is called the target pixel and the data of this pixel is subjected to the binarization to output a bilevel image signal. The other pixels A-D and F-I are called the neighboring pixels, and the data of the pixels is necessary for binarizing the data of the target pixel.

The scanner unit in FIG. 2 further comprises an averaging part 20, an area detecting part 21, and an MTF correction part 22. Data signals DA through DH corresponding to the pixels A through H are output from the matrix register 17 to these parts 20–22 in the following manner. The data signal DA is supplied to the averaging part 20. The data signal DB is supplied to the averaging part 20, the area detecting part 21 and the MTF correction part 22. The data signal DC is supplied to the averaging part 20. The data signal DD is supplied to the averaging part 20, the area detecting part 21 and the MTF correction part 22. The data signal DE is supplied to the averaging part 20, the area detecting part 21 and the MTF correction part 22. The data signal DF is supplied to the averaging part 20, the area detecting part 21 and the MTF correction part 22. The data signal DG is supplied to the averaging part 20. The data signal DH is supplied to the averaging part 20, the area detecting part 21 and the MTF correction part 22.

The scanner unit in FIG. 2 further comprises a dithering part 23, a clamp part 24, a selecting part 25, a binarizing part 26, a selecting part 27, and an output part 28.

The averaging part 20 calculates the average of the values of the data signals DA through DH supplied from the matrix register 17, in accordance with the following equation.

$$DV = (DA + DB + DC + DD + DE + DF + DG + DH)/8 \quad (1)$$

The averaging part 20 outputs a data signal DV indicating the average value according to the equation (1), to the dithering part 23 and to the clamp part 24.

The area detecting part 21 detects whether or not the target pixel is in a uniform density area as follows.

If $|DE-DB| < Te$, $|DE-DD| < Te$, $|DE-DF| < Te$, and $|DE-DH| < Te$, where Te is a given reference value, $\quad (2)$ the pixel E is detected to be in a uniform density area.

If not so, the pixel E is detected not to be in a uniform density area. When the difference between the values of two adjacent pixels according to the formula (2) (the target pixel and each of the up, down, left and right adjacent pixels) is smaller than the reference value, the target pixel is detected to be in a uniform density area. The area detecting part 21 at this time supplies a high-level level signal DT to the selecting part 25 for the target pixel. On the other hand, when the difference according to the formula (2) is not smaller than the reference value, the target pixel is detected not to be in a uniform density area. The area detecting part 21 at this time supplies a low-level signal DT to the selecting part 25 for the target pixel.

The MTF correction part 22 subjects the target pixel to the MTF (modulation transfer function) correction so as to prevent the output image from becoming dull. The MTF correction part 22 calculates the value of MTF corrected data in accordance with the following equation, based on the data signals supplied from the matrix register 17.

$$DEa = 3 \cdot DE - (DB + DD + DF + DH)/2 \quad (3)$$

The MTF correction part 22 supplies a corrected data signal DEa to the binarizing part 26.

The dithering part 23 subjects the average value DV of the averaging part 20 to pseudo-halftone binarization. The pseudo-halftone binarization is performed by applying a dither pattern of given thresholds to each area containing a predetermined number of pixels of the original image. As the result of the pseudo-halftone binarization the dithering part 23 outputs a halftone-mode bilevel signal PH to one input of the selecting part 27.

The clamp part 24 sets the magnitude of the average value DV from the averaging part 20 to a prescribed range, and supplies a data signal MM indicating the thus corrected average value to one input of the selecting part 25. A data signal THp indicating a fixed threshold value is supplied to the other input of the selecting part 25.

When the signal DT supplied from the area detecting part 21 is the high level signal, it is determined that the target pixel is in a uniform density area. The selecting part 25 on that occasion outputs the fixed threshold data signal THp to the binarizing part 26 as threshold data TH used for the binarization. On the other hand, when the signal DT supplied from the area detecting part 21 is the low level, it is determined that the target pixel is not in a uniform density area. The selecting part 25 outputs the corrected average data signal MM to the binarizing part 26 as the threshold data TH used for the binarization.

The binarizing part 26 binarizes the corrected data signal DEa of the MTF correction part 22 by using the threshold data TH of the selecting part 25, and outputs a non-halftone-mode bilevel signal AP to the other input of the selecting part 27 as the result of the binarization.

The control unit 1 of the facsimile system supplies a mode selection signal MDp to the selecting part 27 of the scanner unit 4 via the system bus 11. This mode selection signal MDp indicates a first value when a halftone mode is selected on the facsimile system, and the mode selection signal MDp indicates a second value when a non-halftone mode is selected on the facsimile system.

The selecting part 27 selects one of the halftone-mode bilevel signal PH from the dithering part 23 and the non-halftone-mode bilevel signal AP from the binarizing part 26, in accordance with the mode selection signal MDp. More specifically, the halftone-mode bilevel signal PH is selected by the selecting part 27 when the mode selection signal MDp indicates the first value, and the non-halftone-mode bilevel signal AP is selected by the selecting part 27 when the mode selection signal MDp indicates the second value.

The selecting part 27 supplies the selected bilevel signal BW to the output part 28. The output part 28 outputs the bilevel signal BW to another unit of the facsimile system.

In the image processing apparatus of the present invention described above, each time the analog signal AV corresponding to a dot is output from the reading part 15, the matrix register 17 extracts the data of 3×3 pixels from the sequences of the digital signals DV, DVa and DVb. At the same time, the data signals DA through DH (including the target pixel and the neighboring pixels) are output from the matrix register 17 for each dot of the original image to be transmitted.

Therefore, the operations of the averaging part 20, the area detecting part 21, the MTF correction part 22, the dithering part 23 and the binarizing part 26 described above are repeatedly performed for each dot of the original image.

In the above described image processing apparatus, when the target pixel is detected to be in a uniform density area of the original image, the data signal DT output from the area detecting part 21 is the high level signal. The selecting part 25 supplies the fixed threshold data signal THp to the binarizing part 26 as the threshold TH. Thus, when the pixel is in a uniform density area, the data of the pixel is binarized by using the fixed threshold THp to output a bilevel signal for the pixel.

On the other hand, when the target pixel is detected not to be in a uniform density area of the original image, the data signal DT output from the area detecting part 21 is the low level signal. The selecting part 25 supplies the corrected average data signal MM to the binarizing part 26 as the threshold TH. Thus, when the pixel is not in a uniform density area, the data of the pixel is binarized by using the corrected average value MM to output a bilevel signal for the pixel.

In addition, in the above described image processing apparatus, when the mode selection signal MDp supplied to the selecting part 27 is the first value (the halftone mode), the selecting part 27 outputs the halftone-mode bilevel signal PH of the dithering part 23 to the output part 28 as the bilevel signal BW. On the other hand, when the mode selection signal MDp is the second value (the non-halftone mode), the selecting part 27 outputs the non-halftone-mode bilevel signal AP of the binarizing part 26 to the output part 28 as the bilevel signal BW.

As described above, in the image processing apparatus of the present invention, it is possible to binarize the multilevel image data, read from the original image, by using the fixed threshold value when the target pixel is in a uniform density area. It is possible to binarize the multilevel image data by using the average of the data of the target pixel and its neighboring pixels when the target pixel is not in a uniform density area. Thus, it is possible to prevent the resulting bilevel image from becoming unclear when the multilevel image data is read from an original image containing a uniform density area.

Next, a description will be given of a modification of the averaging part and the MTF correction part of the above described image processing apparatus according to the present invention. FIG. 4 shows a modified circuit part which is shared by the averaging part 20 and the MTF correction part 22.

In FIG. 4, the data signal DE (the target pixel E) from the matrix register 17 is supplied to a first adder 30 and to a second adder 31.

The first adder 30 has two inputs. The data signal DE is shifted one bit to the left (that is, it is multiplied by 2), and the resulting signal is supplied to one input of the first adder 30. Also, the data signal DE from the matrix register 17 is supplied to the other input of the first adder 30.

The data signals DA, DC and DG (neighboring pixels) from the matrix register 17 are supplied to the respective inputs of the second adder 31. The data signals DB, DD, DF and DH (neighboring pixels) from the matrix register 17 are supplied to the respective inputs of a third adder 32.

The first adder 30 outputs a data signal to one input of a subtracter 33, this data signal indicating the value (3E) equal to three times the value of the target pixel E. The second adder 31 outputs a data signal to one input of a fourth adder 34, this data signal indicating the value (A+C+E+G) equal to the sum of the data of the pixels A, C, E and G.

The third adder 32 outputs a data signal to the other input of the fourth adder 34 and to the other input of the subtracter 33. This data signal indicates the value (B+D+F+H) equal to the sum of the data of the pixels B, D, F and H. The data signal output from the third adder 32 is shifted one bit to the right (that is, it is multiplied by ½), and the resulting signal ((B+D+F+H)/2) is supplied to the subtracter 33. Thus, the subtracter 33 outputs a data signal indicating the value (3E−(B+D+F+H)/2), and the output signal of this subtracter 33 is equivalent to the output signal DEa of the MTF correction part 22.

The fourth adder 34 outputs a data signal indicating the value (A+B+C+D+E+F+G+H) equal to the sum of the data of the eight pixels A, B, C, D, E, F, G and H. This data signal is shifted three bits to the right (that is, it is multiplied by ⅛), and the resulting signal is equivalent to the output signal DV of the averaging part 20.

Accordingly, it is possible that the averaging part 20 and the MTF correction part 22 share some elements of the same circuit. Thus, the size of the image processing apparatus can be reduced, and a compact, less expensive image processing device according to the present invention can be built.

Further, the present invention is not limited to the above described embodiments, and variations and modifications may be made without departing from the scope of the present invention.

For example, the matrix register of the above described embodiment extracts the data of nine pixels arranged in a 3×3 matrix pattern. However, the size of the matrix of pixels stored in the matrix register of the present invention is not limited to a specific size. In addition, in the above described embodiments, the mode selection signal MDp is supplied from the external control unit to the selecting part of the image processing apparatus. This mode selection signal can be generated by performing a known area discrimination process in which each dot of the original image is detected to be in a halftone area of the original image or in a non-halftone area thereof. Further, the present invention can be applied to facsimile systems of various kinds other than the group-3 facsimile machine as in the above described embodiments.

What is claimed is:

1. An apparatus for providing a bilevel image signal corresponding to multilevel image data obtained from an original image, said apparatus comprising:

a) matrix register means for reading an original image for each area containing a predetermined number of pixels of the original image, and for extracting multilevel image data corresponding to said pixels of said read area, said pixels including a target pixel and neighboring pixels surrounding the target pixel;

b) averaging means for calculating the average of multilevel image data of:
      (A) the target pixel, and
      (B) neighboring pixels excluding a specific neighboring pixel located below and to the right of the target pixel, extracted by said matrix register means for each area of the original image;

c) binarization means for providing a bilevel image signal corresponding to the multilevel image data of the target pixel by using the average of the multilevel image data from the averaging means as a threshold value of binarization; and d) area detecting means for detecting whether or not the target pixel of the read area is in a uniform density area of the original image, based on whether or not the differences in multilevel image data between the target pixel and the respective neighboring pixels are smaller than a given reference value, and for supplying the result of the area detection for each pixel;

wherein said binarization means provides:
- A) a bilevel image signal corresponding to the multilevel image data of the target pixel by using a fixed threshold value, when the target pixel is detected to be in a uniform-density area, and
- B) a bilevel image signal corresponding to the multilevel image data of the target pixel by using the average of the multilevel image data from the averaging means as the threshold value, when the target pixel is detected not to be in a uniform-density area.

2. An apparatus according to claim 1, wherein said matrix register means reads the original image for each area containing a matrix of 3×3 pixels of the original image and extracts the multilevel image data of the nine pixels.

3. An apparatus according to claim 1, wherein said averaging means calculates the average of multilevel image data of a target pixel and seven neighboring pixels, extracted from the original image for each area containing a matrix of 3×3 pixels of the original image.

4. An apparatus for providing a bilevel image signal corresponding to multilevel image data obtained from an original image, said apparatus comprising:
- a) matrix register means for reading an original image for each area containing a predetermined number of pixels of the original image, and for extracting multilevel image data corresponding to said pixels of said read area, said pixels including a target pixel and neighboring pixels surrounding the target pixel;
- b) averaging means for calculating the average of multilevel image data of:
  - (A) the target pixel, and
  - (B) neighboring pixels excluding a specific neighboring pixel located below and to the right of the target pixel, extracted by said matrix register means for each area of the original image;
- c) area detecting means for detecting whether or not the target pixel of the read area is in a uniform density area of the original image based on whether or not the differences in multilevel image data between the target pixel and the respective neighboring pixels are smaller than a given reference value, and for supplying the result of the area detection for each pixel;
- d) first binarizing means, associated with said area detecting means and said averaging means, for providing:
  - A) a first bilevel signal corresponding to the multilevel image data by using a given threshold value when the target pixel is detected to be in a uniform density area, and
  - B) a first bilevel signal corresponding to the multilevel image data by using the average of the multilevel image data by using the average of the multilevel image data from said averaging means as a threshold value of binarization when the target pixel is detected not to be in a uniform density area;
- e) second binarizing means, associated with said averaging means, for providing a second bilevel signal corresponding to the average of the multilevel image data from said averaging means by using a given dither pattern;
- f) selecting means selectively outputting one of:
  - A) the first bilevel signal from said first binarizing means and
  - B) the second bilevel signal from said second binarizing means, in accordance with a mode selection signal; and
- g) second selecting means for selectively supplying one of said given threshold value and said average of said averaging means, to said first binarizing means, in accordance with the result of the area detection by said area detecting means;

wherein said selecting means receives a mode selection signal from an external control unit for each pixel, and selectively outputs one of the first bilevel image signal and the second bilevel image signal in accordance with said mode selection signal.

5. An apparatus according to claim 4, wherein said matrix register means reads the original image for each area containing a matrix of 3×3 pixels of the original image and extracts the multilevel image data of the nine pixels.

6. An apparatus according to claim 4, wherein said averaging means calculates the average of multilevel image data of a target pixel and seven neighboring pixels, extracted from the original image for each area containing a matrix of 3×3 pixels of the original image.

7. An apparatus according to claim 5, wherein said averaging means provides the average of multilevel image data with respect to eight pixels of the read area, said eight pixels remaining after a specific neighboring pixel located below and to the right of the target pixel has been excluded.

* * * * *